Sept. 3, 1935. E. A. KELLY 2,013,612
MULTIPLE MONTHLY PAYMENT COUPON BOOK
Filed Dec. 12, 1932
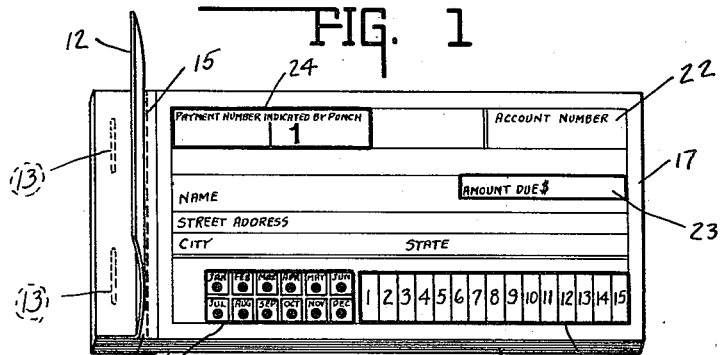
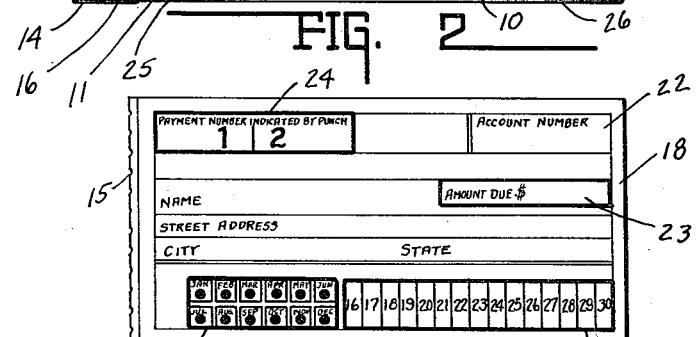
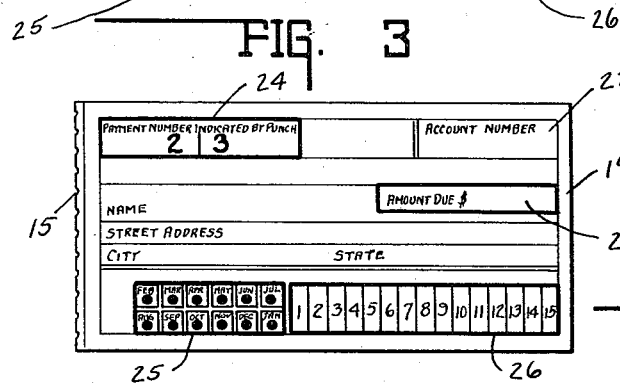
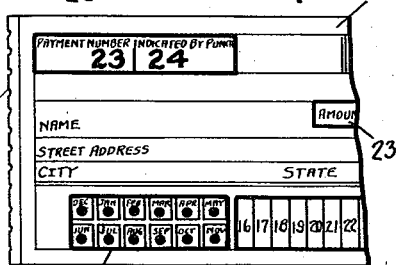
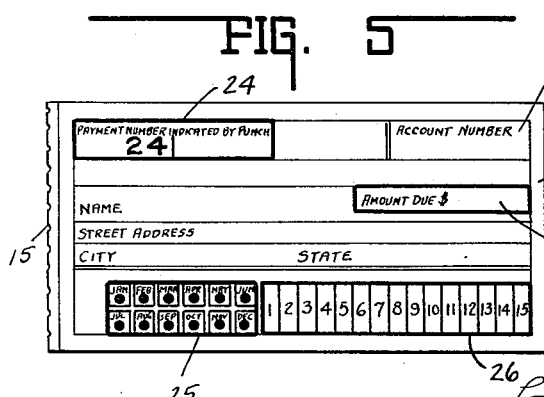
INVENTOR.
EDWARD A. KELLY.
BY
Lockwood Lockwood Gollsmith & Dott
ATTORNEYS.

Patented Sept. 3, 1935

2,013,612

UNITED STATES PATENT OFFICE 2,013,612

MULTIPLE MONTHLY PAYMENT COUPON BOOK

Edward A. Kelly, Indianapolis, Ind.

Application December 12, 1932, Serial No. 646,804

7 Claims. (Cl. 283—63)

This invention relates to a multiple monthly payment coupon book.

The chief object of this invention is to provide a coupon book which is adapted for use in the making of payments regularly and wherein a plurality of payments are made each month.

Herein the invention is illustrated as applied to a semi-monthly book, that is, wherein payments are due semi-monthly. The book may be used for payments running over any number of months and herein the book is illustrated as adapted to accommodate payments running for a period of a year.

The chief feature of the invention consists in the provision of certain areas appropriately designated and provided with certain data which, upon the simultaneous punching of all of the superposed sheets in the book, simultaneously indicated the payment number and the exact date of payment for the particular account for which the book is issued.

The theory of operation is that each coupon sheet includes a payment number area provided with a number of divisions for which the partial monthly payments are made, that is, two divisions for a semi-monthly book and three divisions for a tri-monthly book.

Each coupon also bears a day date area divided into the number of days in the partial monthly period, that is 15 for the semi-monthly book and 10 for the tri-monthly book.

The reason only 15 days are utilized for the semi-monthly book is that the average month has 30 days and months having 31 days are considered as having the 31st date payment due on the first day of the month.

The purpose of the invention, therefore, is to provide a universal book suitable for use throughout the year and adapted to be initiated at any day during the year, although the same principle as applied to the semi-monthly book, as heretofore indicated, may be applied to a tri-monthly book.

Each coupon also has a monthly area divided into the number of months and in the semi-monthly book, the monthly designation of the 1st and 2nd, 3rd and 4th, 5th and 6th, et cetera, are identical, that is the 1st and 2nd coupons have their same monthly data registering and the 3rd and 4th coupons have the next succeeding month data registering with the aforesaid mentioned data of the 1st and 2nd coupons. In a semi-monthly book, the number of coupons provided is equal to twice the number of months plus one and if applied to a yearly book, the monthly data on the last coupon are identical with that of the monthly data on the 1st and 2nd coupons.

The date registrations are offset in successive coupons for a semi-monthly book; that is, the date registrations of all of the odd number coupons are identical and the date registrations for all of the even number coupons are identical but the first date data of the second coupon are the same as the first day date of the first coupon increased by fifteen, so that the first coupon has date designations bearing the dates 1 to 15 and the second date designations in this area are 16 to 30, respectively.

In use if the initial payment is made in the last half of the month, the first coupon is detached and the second coupon in the book becomes the first coupon, evidencing payment. If the first payment is made in the first half of the month, the last coupon in the book is detached, providing the monthly payments are scattered over the full year period. If the monthly payments run for a smaller number of months than a year, for example eight, then of the twenty-five coupons provided for a yearly book, the last nine coupons are detached and destroyed if the payment is made in the first half of the month and if payment is made in the last half of the month for a period of eight months, then the last eight coupons are detached and the first coupon in the book is detached. Thereafter, a punching operation simultaneously designates successive due dates and successive payment numbers.

A suitable perforating machine may also be employed for applying to each of the coupons simultaneously the account number and the amount of each equal payment due on the payment date or a printing device may be used for applying to each of the coupons the account number and the amount due for each payment.

At the time the first payment is made, all of these operations are performed and the book is turned over to the one making the payments and when the payment is made the uppermost coupon is detached, stamped "Paid" and placed in the file of the one to whom payment is made and these constitute receipts for payment, or the book may be used in a reverse manner, that is the one to whom payment is to be made may retain the book and upon payment being made, the receipted coupon may be detached and delivered to the one making the payment as a receipt of said payment. Usually the first method is employed.

The full nature of the invention will be understood from the accompanying drawing and the following description and claims:—

In the drawing, Fig. 1 is a perspective view of a multiple monthly payment coupon book, the cover being shown open and exposing the first coupon.

Fig. 2 is a plan view of the second coupon in the book.

Fig. 3 is a plan view of the third coupon in the book.

Fig. 4 is a plan view of part of the second last coupon in a semi-monthly book arranged to cover a period of payments for one year.

Fig. 5 is a view similar to Figs. 2 and 3 of the last or 25th coupon in the book.

In the drawing, 10 indicates a plurality of coupon sheets superimposed one upon the other and of the desired number for a predetermined payment period. For a semi-monthly book usually twenty-five coupons are provided to cover a total payment period of one year. For a payment period of eighteen months, thirty-seven coupons would be utilized for semi-monthly payments.

The book is usually provided with a back 11 and a front cover 12. Each of the coupon sheets includes an extended portion 16 connected to the main body of the sheet by a scoring or perforation 15. Excess portions 16 form the stubs and the coupon sheets are secured together and the covers are secured together by any suitable means, such as the stapling 13, and these, if desired, may be covered by the tape 14 in the usual manner in which coupon books of the more expensive type are formed.

In the drawing the numeral 17 indicates the first coupon sheet. The numeral 18 indicates the second coupon sheet. The numeral 19 indicates the third coupon sheet. The numeral 20 indicates the second last sheet, and the numeral 21 indicates the last sheet of a coupon book arranged for semi-monthly payment and for a total payment period of one year.

Each coupon sheet is divided by lines into predetermined areas and is adapted to receive certain data, a portion of which is printed and a portion of which is applied when the book is issued for use. One area is designated by the numeral 22 and appropriately designates the account number. At the time of printing, the account number is applied to each of the account number areas 22.

There is also provided a space indicated by the numeral 23, designating the amount due, and the amount due for each payment is applied to each of the coupon sheets by perforating or rubber stamping. When the amount of each payment is the same for all accounts, this amount also may be printed.

Each portion of each sheet includes a payment number area designated by the numeral 24. These payment numbers also are printed in at the time the book is manufactured. With a semi-monthly book, this area is divided into two divisions. The total area 24 is appropriately designated with the legending "Payment number".

The following description applies to a semi-monthly book arranged for a total payment period of twelve months.

The first coupon sheet 17 has in the right hand division of the payment number area the numeral "1". The second coupon sheet, indicated by the numeral 18 in Fig. 2, has the payment number area provided with payment number designations, "1" in the left hand division and "2" in the right hand division, the payment #2 of the second sheet being in registration with payment #1 of the first sheet and payment #1 of the second sheet being in registration with the blank space on the right hand division of the payment number area 24 of the first sheet.

Payment number area 24 of the third sheet has in the left hand division, "Payment number 2" and in the right hand division has "Payment number 3" printed thereon. The second last sheet 20 has the payment number area 24 provided with the payment number "23" in the left hand division and payment "24" in the right hand division. The last sheet 21 has its payment number area 24 provided with "Payment number 24" in the left hand division and no payment number in the right hand division.

The purpose of this multiple and herein dual payment number designation on successive sheets and the absence of payment numbers on the first and last sheets for a semi-monthly book, will appear more fully hereinafter.

Each coupon sheet in addition to the payment number area, is provided with a month designating area indicated by the numeral 25 and the same is divided into twelve divisions, for convenience arranged in two superposed series of six. All of the twelve months are printed on each coupon sheet.

The first coupon sheet 17 has the upper left hand month division provided with the abbreviation of the month January, the second division to the right is provided with the abbreviation of the second month, or February. The first lower division to the right is provided with the abbreviation of the month July, and so on throughout the coupon month by divisions.

The second coupon 18 has its monthly designating area provided with the abbreviation of the month January. The second division to the right thereof is provided with the abbreviation of the second month or February, and in this respect coupons #1 and #2 are identical.

Coupon #3 has its month designating area provided with a like number of divisions but the first or upper left hand division contains the abbreviation of the second month or February, and the second division to the right thereof contains the abbreviation of the third month, or March, while the first lower left hand division bears the abbreviation of the eighth month, or August.

The second last coupon 20 has its monthly area similarly divided and adapted for registration with the other areas and the upper left hand division thereof bears the abbreviation of the last month of the year and immediately adjacent thereto and to the right, the division bears the abbreviation of the first month, while the lower left hand division bears the abbreviation of the sixth month, or June.

The last coupon sheet 21 in its monthly area has its upper left hand monthly division provided with the abbreviation of the first month and all the remainder of the monthly areas bear abbreviations similar to that applied to coupons #1 and #2, but it will be noted that the second last coupon does not correspond to coupon #3 so far as monthly data are concerned, since the upper left hand divisions of coupon #3 and the second last coupon bear respectively the designations "February" and "December".

Each coupon sheet also is provided with a day date area 26 which is divided into a number of divisions corresponding to the number of days in each part of the month constituting the payment period. In other words, for a bi-monthly payment arrangement, each day date area is divided into fifteen sub-divisions.

If three payments per month are to be made, the coupons are arranged in sets of three and the day of the month data for each coupon of the set are arranged consecutively. For instance, the first coupon of the set bears dates from the first to the tenth of the month, the second coupon bears dates from the eleventh to the twentieth of the month, and the third coupon bears dates from the twenty-first to the thirtieth of the month. The date area on each coupon of the set is in register with the date areas on the others, the day indicia on each coupon of the set being spaced exactly the same predetermined period with respect to the day indicia of the other coupons of said set of three.

In a bi-monthly book each of the successive pairs of superposed coupons are similarly numbered so that numbers 1 to 16 are in alignment and at the left of the day date area in the first division of each coupon, and 15 and 30 register at the right of the day date area.

Similarly, in a three-payment per month book, dates 1, 11 and 21 would be in alignment and 10, 20 and 30 would be in alignment at the left and right hand portions of the day data area respectively, on the three monthly coupons.

Each coupon also is provided with a space that is adapted to receive the name of the person to whom the book is issued and other data relative thereto, such as shown in Fig. 1.

When a three payment month plan book is used, the third coupon, as before stated, has its "Payment number" area divided into three divisions and the first coupon bears "1" and the twelve months in the monthly areas and ten day designations, these being 1 to 10.

The second coupon has numbers 1 and 2 in two of the three divisions of the "Payment number" area and the twelve monthly designations and daily designations of 11 to 20.

The third coupon has the three "Payment number" area divisions provided with payment numbers 1, 2 and 3, the twelve monthly designations and the daily designations of 21 to 30.

With the three to the month payment plan, the month designations after every third coupon will shift in accordance with the general principle shown herein for the semi-monthly payment plan, since it will be observed that the third coupon—see Fig. 3—has the second month in the first month division of the monthly area and in accordance therewith also the fifth coupon has the third month and the seventh coupon has the fourth month, and so on until the twenty-third coupon has the twelfth month in the first monthly division of the month area.

The operation of the book is as follows, and is described relative to the semi-monthly payment book shown specifically herein.

If the first payment is made in the first half of the month, the 25th or last coupon for a twelve-month payment period is detached and the payment number is indicated by a punch in the payment number area and the day upon which the first payment is made is indicated by the punch in the appropriate date division of the day date area. Similarly, the appropriate month division is punched corresponding to the month in which the first payment is made. These being the variables relative to the coupon, all of them are simultaneously indicated or designated by the three punchings in all of the coupons.

If the payment is made in the last half of the month, the first coupon is detached and the division of the "Payment number" area containing payment #1 is punched together with all of the succeeding coupons. Similarly, the month in which the payment is made is punched and also the date upon which the payment is made.

With three payments to the month, if the payment is made in the first third of the month, the last two coupons are detached, they being surplus coupons. If the payment is made in the second third of the month, the first coupon and the last coupon are detached. If payment is made in the last third of the month, the first two coupons are detached and for a total payment period of a year there would be provided 38 coupons, of which 2 always would be detached.

In other words, the invention is directed broadly to the idea of providing a multiple monthly payment book which is universal in its application in that the first payment may be made at any time during the month and by three punchings. The payment number and the corresponding date of payment are relatively accurately and simultaneously applied to all of the coupons.

From the foregoing it will be understood that the payment number divisions 24 are so identified as to divide the group of coupons into two sets of coupons, the first set including all coupons from the first coupon to the next to the last coupon and the other set including the second coupon to the last coupon. Each coupon except the first and last coupons is provided with two payment numbers one of which is a duplicate of one of the payment numbers of the coupon which immediately precedes it, so as to provide serial numbers for the respective sets of coupons, the first coupon and the last coupon having a single payment number constituting one of the serial numbers of a set. For instance, the numeral I on the payment number division 24 of coupon 18 is a duplicate of the payment number I in the payment number division of coupon 17, but the respective numbers are offset or staggered with respect to each other. The same applies with equal force to the payment number 2 of coupon 18 and payment number 2 of coupon 19. The arrangement is such that when the payment number divisions of the superposed coupons are in register, the numbers of either of the divisions of either set of coupons will run relatively continuous with respect to each other through the stack of coupons. Therefore, a punch hole through a payment number division will pass through relatively continuous numbers.

It will also be understood that in the semi-monthly payment coupons for instance, the coupons are arranged in pairs and that the month divisions of the coupons of each pair are duplicates of each other and will register with each other while in superposed relation. It will also be noted that the month divisions of each pair of coupons are staggered with respect to the correspondingly identified month divisions of the other pairs of coupons so that when the coupons are in superposed relation, all of the month divisions of the successive pairs of coupons will run in relatively continuous chronological order with respect to any selected month division of the topmost pair of coupons.

It will also be noted that with the semi-monthly payment arrangement, for instance, each coupon bears day number divisions 26 but that the coupons are arranged in pairs with the day divisions of the superposed coupons of a pair in register. Also, that the date indicia of the coupon of one pair which registers with any given date indicia of the other coupon of the same pair indicate a predetermined period of separation, namely, one-half of a month so that the day indicia on each coupon of a pair are spaced exactly the same predetermined period with respect to the day indicia of the other coupon of each pair.

As a result of the described arrangement a punch hole through a selected payment number division will go through correspondingly positioned payment number divisions, continuously numbered with respect to each other. Likewise a punch hole through any selected month designation will pass through relatively continuous chronologically arranged month designations registering with the designation which provides the index for the punch hole. A similar situation exists with respect to the day indication whereby a punch hole through any selected date of any coupon will pass through the division for the same day on one coupon of each pair and through a predeterminedly separated day in the other coupon of each pair.

Of course, where the semi-monthly form is used, as above described, if the first payment is made on or before the right hand division of the payment number area, the coupon 21 at the back of the book becomes superfluous and may be removed. In a like manner, if the payment is made on or after the sixteenth, the punch mark is made in the left hand division of the payment number indicia, and in that event the first coupon 17 becomes superfluous and should be removed. In other words, the excess coupon of either group of coupons is disengaged from its group so as to limit the number of coupons of each set to the number required to designate the full number of periodical payments to be made, so that the indicated payments may be started at an intermediate period.

Another important advantage is that there is a definite relation between the consecutive arrangement of the superposed payment numbers and the due dates of the respective coupons, as established by the chronologically arranged superposed month indicia. For instance, assume that the coupons are issued to cover a total payment of $600 in twelve equal payments of $50 each, and that five payments have been made. The coupon bearing the number 6 would then be the topmost coupon of the book, because the preceding coupons would have been removed. Thus at a glance the information is conveyed that five payments of $50 each have been made, totalling $250, and that seven payments of $50 remain unpaid, totalling $350. Thus there is always a definite consecutive record of the amount paid and the amount due on any date indicated by the topmost coupon of any group, or any integrated date of the other coupons of each group, and the date on which the next payment is due.

It is recognized, of course, that when the first payment is made on the 31st day, that date is considered as the first day of the next month and when there are thirty one days in a month, the one making the payment has an additional day of grace. This applies to both books that are arranged for semi-monthly and three to the month payments.

In view of the cost of entering payments and the keeping of records in connection therewith, the entire tendency of the partial payment plan is to depart from the weekly and three to the month payments, and is being directed to the semi-monthly payment plan, which readily lends itself to simplicity of entering and also the semi-monthly payment keeps the total monthly payment to one-half of that of a single monthly payment so that in view of this tendency and the largest percentage of payees being persons of small means, the semi-monthly book appears to have the widest market and commercial field.

While the invention has been described in great detail in the foregoing specification, various departures therefrom may be made by those skilled in the art along the lines set forth in said description relative to other than semi-monthly books and the exact positioning of the respective "Payment number" areas, monthly data receiving areas and day date receiving areas may be changed on the coupons from that specifically shown herein, all without departing from the invention, and all are considered to be within the broad purview of the invention, reference being had to the appended claims.

The invention claimed is:—

1. A multiple-payment-coupon-book comprising a plurality of coupons superposed one upon another, each coupon except the first and last coupons having thereon two continuous identifying numbers and the first and last coupons each having a single identifying number, said numbers being located in a predetermined position on the respective coupons so that the numbers on each coupon are in register with numbers of the other coupons while the latter are in superposed relation, one number of each coupon being a duplicate of a corresponding number of the next adjacent coupon but offset with respect thereto in such manner that all registering numbers of the groups of superposed coupons are arranged in two series of continuous consecutive numbers from the top coupon to the next to the last coupon, and from the second coupon to the last coupon of the superposed group of coupons, each coupon also containing predeterminedly positioned date indicia so arranged that all of said indicia are in register with each other while the coupons are in superposed relation, and in such manner that the dates indicated by all of the registering date indicia run successively from the top to the bottom of the superposed coupons.

2. A multiple-payment-coupon-book comprising a plurality of coupons superposed one upon another, each of said coupons having indicated thereon a set of payment number spaces located in a predetermined position on the coupon, said spaces except those on the first and the last coupons bearing consecutive numbers, the first coupon and the last coupon each bearing a single number, each number on each coupon except the first and the last coupons being a duplicate of a corresponding number on the next adjacent coupon, the duplicate numbers being offset with respect to each other, with all of the numbered spaces of each coupon in register with the corresponding located numbered spaced of the other coupons while the coupons are in superposed relation, so that the registering numbered spaces will bear relatively continuous numbers from the topmost coupon to the next to the last coupon and from the second coupon to the last coupon of the superposed coupons, each coupon also containing predeterminedly positioned date indicia so arranged that all of said indicia are in register with each other while the coupons are in superposed relation, and in such manner that the dates indicated by all of the registering date indicia run successively from the top to the bottom of the superposed coupons.

3. A multiple-payment-coupon-book comprising a plurality of coupons superposed one upon another, each coupon except the first and the last coupons having thereon two relatively continuing identifying numbers and the first and last coupons each having a single identifying number, said numbers being located in a predetermined position on the respective coupons so that the numbers on each coupon are in register with numbers of the other coupons while the latter are in superposed relation, one number of each coupon being a duplicate of a corresponding number of the next adjacent coupon but offset with respect thereto in such manner that all registering numbers of the groups of superposed coupons are arranged in a plurality of series of relatively continuous numbers from the first coupon to the next to the last coupon and from the second coupon to the last coupon of the superposed group of coupons, each coupon containing indicia at a predetermined position thereon and denoting a plurality of relatively continuous intervals of time, so that said denoted continuous intervals of time are in register with corresponding denoted continuous intervals of time of the other coupons while the coupons are in superposed relation, the denoted continuous intervals of time of each coupon being the same as those of the other superposed coupons, but offset with respect thereto in such manner that all registering denoted continuous intervals of time of the coupons are arranged continuously from the top coupon to the next to last coupon and from the second coupon to the last coupon of the superposed coupons, each coupon also having a set of relatively continuous numerical characters located in the same predetermined position on all of the coupons, the last mentioned numerical characters on alternate coupons being the same, with said characters on one set of alternate coupons being in relative numerical continuation of the characters of the other set of alternate coupons.

4. A multiple-payment-coupon-book comprising a plurality of coupons superposed one upon another, each coupon except the first and the last coupons having thereon two relatively continuous identifying numbers and the first and last conpons each having a single identifying number, said numbers being located in a predetermined position on the respective coupons so that the numbers on each coupon are in register with numbers of the other coupons while the latter are in superposed relation, one number of each coupon being a duplicate of a corresponding number of the next adjacent coupon but offset with respect thereto in such manner that all registering numbers of the groups of superposed coupons are arranged in two series of relatively continuous numbers running from the top coupon to the next to the last coupon and from the second coupon to the last coupon of the superposed group of coupons, each coupon bearing a set of numerical characters located in a predetermined position on the coupon, the numerical characters on each coupon being duplicates of corresponding characters on alternate coupons, said coupons being arranged in consecutive sets, the numerical characters of each coupon of a set registering with corresponding numerical characters of the other coupon of the set while the coupons are in superposed relation, the characters of one series of alternate coupons being arranged in relatively continuous succession with respect to the characters of the other series of alternate coupons, so that the sets of registering numerical characters of alternate coupons indicate the same predetermined continuous interval of time between said alternate coupons throughout the superposed coupons.

5. A multiple-payment-coupon-book comprising a plurality of coupons superposed one upon another, each coupon except the first and the last coupons having thereon two relatively continuous identifying numbers and the first and last coupons each having a single identifying number, said members being located in a predetermined position on the respective coupons so that the numbers on each coupon are in register with numbers of the other coupons while the latter are in superposed relation, one number of each coupon being a duplicate of a corresponding number of the next adjacent coupon but offset with respect thereto in such manner that all registering numbers of the groups of superposed coupons are arranged in two series of relatively continuous numbers running from the top coupon to the next to the last coupon and from the second coupon to the last coupon of the superposed group of coupons, each coupon containing indicia at a predetermined position thereon and denoting a plurality of relatively continuous intervals of time, so that said denoted intervals of time are in register with corresponding denoted continuous intervals of time of the other coupons while the coupons are in superposed relation, the denoted intervals of time of each alternate coupon being the same as those of the other correspondingly alternate superposed coupons, but offset with respect thereto in such manner that all registering denoted intervals of time of the coupons are arranged continuously from the top coupon to the next to the last coupon and from the second coupon to the last coupon of the alternate superposed coupons, each coupon bearing a set of numerical characters located in a predetermined position on the coupon, the numerical characters on each coupon being duplicates of corresponding characters on all of the other alternate continuous coupons, and all arranged in relatively continuous order, the said numerical characters of each coupon registering with corresponding continuous numerical characters of the other coupons while the coupons are in superposed relation, the characters of alternate coupons being a relatively continuous succession of the characters of the other coupons, so that the sets of registering continuous numerical characters of alternate coupons indicate the same predetermined continuous interval of time between said alternate coupons throughout the superposed coupons.

6. A multiple-payment-coupon-book comprising a plurality of coupons superposed one upon the other, there being one coupon in excess of the number of payments to be made, said group being divided into two sets, one set consisting of all of the coupons from the first coupon to the next to the last coupon and the other set consisting of the second coupon to and including the last coupon, each coupon except the first coupon and the last coupon having thereon two relatively continuous identifying numbers and the first and the last coupons each having a single identifying number, said numbers being identifying numbers located in a predetermined position, so that the numbers on each coupon are in register with numbers of the other coupons while the latter are in superposed relation, one number of each coupon being a duplicate of a corresponding number of the next adjacent coupon, but offset with respect thereto in such manner that all registering numbers of the group of superposed coupons are arranged in relatively continuous order from top coupon to the next to the last coupon, and from the second coupon to the last coupon of the superposed group, each coupon containing indicia denoting a plurality of continuously successive intervals of time at a predetermined location on the coupon, so that said denoted intervals of time are in register with denoted intervals of time of the other coupons while the coupons are in superposed relation, the denoted intervals of time of each alternate coupon being the same as those of the other correspondingly alternate superposed coupons but offset with respect thereto in such manner that all registering denoted intervals of time of the alternate superposed coupons are arranged consecutively from the top coupon to the next to the bottom coupon and from the second coupon to the bottom coupon of the superposed coupons, each coupon bearing a set of relatively continuous numerical characters located in a predetermined position on the coupon, the relatively continuous numerical characters on each coupon being duplicates of corresponding characters on alternate coupons, and all arranged in relatively continuous order, numerical characters of each coupon registering with corresponding continuous numerical characters of the other coupons while the coupons are in superposed relation, the characters of alternate coupons being relatively continuous with respect to the characters of the other coupons, so that the sets of registering numerical characters of alternate coupons indicate the same predetermined interval of time between said alternate coupons throughout the superposed coupons, the coupons of said sets of coupons being so disposed and arranged with respect to each other that the topmost coupon or the last coupon may be disengaged from the group of coupons so as to limit the number of coupons to the number of either set of coupons which may be required to designate the full number of periodical payments.

7. A multiple-payment-coupon-book comprising a plurality of pairs of superposed coupons and one additional coupon, each coupon except the first and the last coupons having thereon a plurality of relatively continuous identifying numbers located in a predetermined position so that the numbers on each coupon are in register with the numbers of the other coupons while the latter are in superposed relation, one number of each coupon being a duplicate of a corresponding number of the next adjacent coupon but offset with respect thereto in such manner that all registering numbers of all of the superposed coupons are arranged consecutively from the top coupon to the next to the last coupon and from the second coupon to the last coupon of the total number of superposed coupons, each coupon containing at a predetermined position thereon indicia denoting a plurality of relatively continuous intervals of time, so that said denoted continuous intervals of time are in register with denoted continuous intervals of time of the other coupons while the coupons are in superposed relation, the denoted intervals of time of each coupon being the same as those of the other superposed coupons but offset with respect thereto in such manner that all registering denoted intervals of time of the superposed coupons are arranged continuously from the top coupon to the next to the last coupon and from the second coupon to the last coupon of all of the superposed coupons, each coupon bearing a set of relatively continuous numerical characters located in a predetermined position thereon, the continuous numerical characters of each coupon registering with correspondingly positioned continuous numerical characters of the other coupons while in superposed relation, the characters on one coupon of each pair being in relatively continuous order with respect to the continuous numerical characters of the other coupon of the pair, so that the registering numerical characters of alternate coupons indicate the same predetermined interval of time between the coupons of each pair while the coupons are in superposed relation, the plurality of pairs of coupons and the excess coupon being so related and arranged with respect to each other that the excess coupon may be disengaged from the total number of superposed coupons, so as to selectively limit the number of remaining coupons to either set of coupons, whereby the indicated payments are arranged to conform to a semi-monthly basis.

EDWARD A. KELLY.